United States Patent Office 3,474,086
Patented Oct. 21, 1969

3,474,086
NOVEL ORGANIC DERIVATIVE OF BISMUTH AND ALUMINUM AND PROCESS FOR ITS PREPARATION
Raymond Lardé, Coubron, and André Couillaud, Rosny-sous-Bois, France, assignors to Roussel-Uclaf, Paris, France, a corporation of France
No Drawing. Filed June 28, 1966, Ser. No. 561,062
Claims priority, application France, July 1, 1965, 23,120
Int. Cl. C08b 19/12; A61k 25/00
U.S. Cl. 260—209.5
8 Claims

ABSTRACT OF THE DISCLOSURE

The present invention relates to a novel organic derivative of bismuth and aluminum, the double pectinate of bismuth and of aluminum, containing between about 23% and about 25% by weight of bismuth and between about 0.5% and about 1.5% by weight of aluminum. The present invention relates furthermore to a process for the preparation of the said derivative of bismuth and to its therapeutic utilization.

THE PRIOR ART

Aluminum pectinate solutions are disclosed as intermediates in United States Patent No. 2,550,705. Attention is also directed to French B.S.M Patent No. 1,660M.

OBJECTS OF THE INVENTION

An object of the present invention is the obtention of a new derivative of pectin, the double pectinate of bismuth and aluminum, particularly the double pectinate of bismuth and aluminum containing between about 23% and about 25% by weight of bismuth and between about 0.5% and 1.5% by weight of aluminum.

Another object of the present invention is to develop a process for the preparation of the said double pectinate of bismuth and aluminum.

A further object of the invention is to obtain therapeutic compositions containing said double pectinate of bismuth and aluminum.

A yet further object of the invention is the development of a therapeutic process of treating patients having gastrointestinal disturbances which comprises administering a safe but effective dose of the double pectinate of bismuth and aluminum.

These and other objects of the invention will become more apparent as the description thereof proceeds.

DESCRIPTION OF THE INVENTION

The novel organic derivative of bismuth, object of the invention, possesses interesting pharmacological properties. More particularly, it is useful for the treatment of gastrointestinal ailments in human and veterinary medicine, especially as a gastric, intestinal and antidiarrheic dressing.

It can be utilized in the treatment of digestive disturbances, such as: gastric and duodenal ulcers, gastric duodenitis, dyspepsia, spasmatic colitis, postamoebic colitis, diverticularly sigmoiditis, and colopathia accompanying occurrences of diarrhea.

Derivatives of pectin and of bismuth are already known to the art as utilizable for the treatment of gastrointestinal disorders. Thus, in copending, commonly assigned United States patent application Serial No. 227,704, now patent No. 3,306,819 a pectate of bismuth has been described, the content of bismuth being between 10 and 30%. However, this pectate of bismuth is prepared starting with the pectin. Pectin is a raw substance of natural origin, quite variable in its structure and its composition, according to its origin or the treatments it has been subjected to. Consequently, the pectate of bismuth with a content of bismuth as previously specified, can be variable in regard to its elementary composition. In particular, pectin being a macromolecule formed by a tetragalacturonic acid linkage, may be substituted by a very variable number of bismuth atoms.

While this prior application recites that the bismuth derivative of pectin is a pectate of bismuth, preferred nomenclature would be a pectinate of bismuth since the pectin molecule is not fully hydrolyzed to pectic acid.

Theoretically, pectin has a molecular weight of from 30,000 to 500,000 and is comprised of about a 75% methylated tetragalacturonic acid moiety having the structural formula

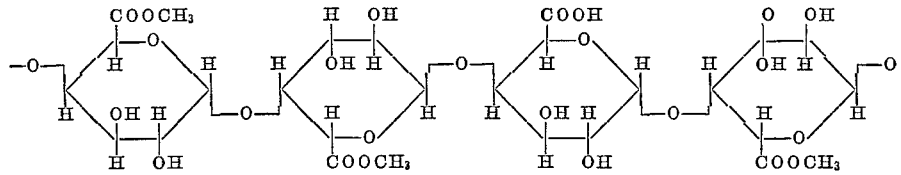

The amount of methyl groups, of course, can vary.

At present, it has been discovered that the double pectinate of bismuth and aluminum, object of the invention, represents a novel insoluble bismuthic derivative. In comparison with the pectate of bismuth, previously described in the U.S. application Ser. No. 227,704, it possesses an increased therapeutic interest and a distinctly enlarged field of activity.

Moreover, its obtention is more interesting considering the possibilities of advantageous industrial realization which it represents. In fact, owing to the presence of the aluminum, the ratio of saturation of the pectin is more perfect. It follows therefrom that the condition of complete insolubility of the double pectinate of bismuth and of aluminum can be obtained in a determined pH zone. The separation of the precipitate, the elimination of the mother liquors and the washings of the precipitate have been found, because of this, to be greatly facilitated. The yield in utilizable product is higher as the result of the practically total precipitation of the novel bismuthic derivative. This is why the conversion of the soluble bismuth salt into double pectinate of bismuth and aluminum and the precipitation of the pectin in the form of insoluble salt are complete. Moreover, the properly required labor in the manufacture of the novel organic bismuth derivative is diminished due to the greatly simplified process for the preparation of the said derivative, a further object of the invention.

The double pectinate of bismuth and aluminum, object of the invention, results from the salification of the free carboxyls and hydroxyls of each tetragalacturonic link of the pectin molecule.

The process for the preparation of the double pectinate of bismuth and aluminum, also object of the invention, is characterized in that an aqueous solution of a bismuth salt of a strong mineral acid and an aqueous solution of an aluminum salt of a strong mineral acid are made to act on an aqueous solution of pectin. The pH value of the reaction media is raised between 3.5 and 5 by means of an aqueous solution of an alkaline metal carbonate, bicarbonate or hydroxide, or by means of an aqueous ammonia solution, and the double pectinate of bismuth and aluminum thus formed is isolated.

The execution of the process, object of the invention, is advantageously carried out in the following manner:

(a) The bismuth salt of a strong mineral acid is bismuth nitrate;

(b) The aluminum salt of a strong mineral acid is aluminum nitrate;

(c) The reaction of pectin with the salts of bismuth and aluminum is effected in the presence of an organic polyol, such as sorbitol, mannitol or glycerol;

(d) Advantageously the organic polyol is mixed with the solution of the bismuth salt in order to suppress hydrolysis of the salt of bismuth, avoiding precipitation of basic salts or hydroxides of bismuth.

The following examples will serve for a better comprehension of the invention. However, it is to be understood, that they do not limit the invention in any manner.

Example I (1) Preparation of the solution of bismuth nitrate.— 340 gm. of bismuth nitrate and 250 gm. of sorbitol were dissolved in 700 cc. of water while agitating and maintaining a temperature of 30 to 35° C. Then 135 cc. of a sodium hydroxide solution, containing 400 gm. of sodium hydroxide per liter, were added while continuing the agitation and while cooling the reaction mixture to maintain the temperature at 30 to 35° C. The solution obtained was diluted with water to bring its volume to 2 liters.

(2) Preparation of the aluminum nitrate solution.— 150 gm. of aluminum nitrate were dissolved in 150 cc. of water under agitation, thus obtaining about 250 cc. of solution.

(3) Preparation of the pectin solution.—Slowly and under agitation 500 gm. of pectin were introduced into 20 liters of water. The agitation was continued for 1 hour. In this manner a pectin solution was obtained which had a pH value of about 3.9.

(4) Preparation of double pectinate of bismuth and aluminum.—Slowly and under agitation 2 liters of the bismuth nitrate solution, prepared according to Step 1, were added to the pectin solution obtained according to Step 3, and the agitation was continued for 15 minutes. Thereafter, slowly and always under agitation, 250 cc. of the aluminum nitrate solution, prepared according to Step 2, were added to the reaction mixture. The agitation was maintained for 15 minutes. Next, 400 cc. of an aqueous 10% sodium carbonate solution were added to the reaction mixture under agitation, and the addition of the sodium carbonate solution was continued to obtain a pH value equal to 4. The reaction mixture was agitated for 15 minutes longer; then it was allowed to rest for 30 minutes. The precipitate was separated and subjected in a hydraulic press to a pressure of 100 to 120 kg./cm.² The pressed precipitate was then washed several times with water and finally vacuum filtered. Thus, 7 kg. of raw product were obtained which was introduced into 7 liters of methanol and left in contact for 1 hour while agitating the solution from time to time. Next, the residue was separated, vacuum filtered and subjected in a hydraulic press to a pressure of 150 kg./cm.² In this manner, 2.500 kg. of product were recovered, which was dried under vacuum for 24 hours. The double pectinate of bismuth and aluminum was pulverized over a period of 24 to 48 hours; thereafter it was passed through a sieve. 650 gm. of product were obtained, being a yield of 96% of theory.

The double pectinate of bismuth and aluminum, thus obtained, contained 23% of bismuth and 1% of aluminum by weight. It occurred in the form of a fine, white or slightly cream-colored powder, insoluble in water and in the usual organic solvents.

The product was soluble in aqueous solutions of strong mineral acids, and this solution showed in this case a high dextrorotatory power in relation to the rotatory power of the pectin employed as a starting compound.

The rotatory power of the double pectinate of bismuth and aluminum, obtained according to the above example, is: $[\alpha]_D^{20} = +1.65°$ (c.=0.5% in 5 N HCl).

As far as it is known, the double pectinate of bismuth and aluminum is not described in the literature.

As it was indicated in the preceding, the novel double pectinate of bismuth and aluminum containing between about 23% and 25% by weight of bismuth and between about 0.5% and 1.5% by weight of aluminum possesses interesting pharmacological properties. More particularly, it is useful for the treatment of gastrointestinal ailments, especially as a gastric, intestinal and antidiarrheic dressing.

It allows the treatment of digestive disturbances, such as: gastric and duodenal ulcers, gastric duodenitis, dyspepsia, spasmodic colitis, postamoebic colitis, diverticulary sigmoiditis and colopathia accompanying occurrences of diarrhea.

It can be utilized for the treatment of gastrointestinal ailments, such as gastritis with hyperchlorhydria, gastroduodenal ulcers as well as for all of the intestinal disturbances amenable to a protection of the mucous membrane by a dressing, and of diarrhea of infectious, toxic or symptomatic origin.

The new pectinate forms in the gastric juice a gel which allows a better coating of the gastric mucous membrane.

It is utilized orally. It can be prepared in the form of sachets, powders, aromatized powders, granules, emulsions, gels, colloidal, suspensions and lacteous suspensions.

The average quantity to be administered within 24 hours is 5 gm. of the active principle, but this amount can be modified dependent on the case to be treated and the dosage is susceptible to being considerably increased. Average daily doses of between about 1 gm. and about 25 gm. may be employed.

The pharmaceutical forms, such as sachets, powders, aromatized powders, granules, emulsions, gels, colloidal suspensions or lacteous suspensions are prepared according to the usual processes.

The double pectinate of bismuth and aluminum can be employed in pure form or associated with other active products having a defined therapeutic action or in a medium suitable for its therapeutic utilization.

In the following, as nonlimiting examples, are presented three pharmaceutical formulations of the double pectinate of bismuth and aluminum.

Example II 5 gm. of the double pectinate of bismuth and aluminum, as prepared in Example I, finely pulverized, for a sachet to be mixed in a glass of water.

Example III

| | Gm. |
|---|---|
| The double pectinate of bismuth and aluminum, as prepared in Example I | 25 |
| Sodium chloride | 1 |
| Citric acid syrup or raspberry syrup | 20 |
| Water, q.s.p. 100 cc. | |

Example IV

| | Gm. |
|---|---|
| The double pectinate of bismuth and aluminum, as prepared in Example I | 1.5 |
| Bismuth subnitrate | 3.5 | for a sachet to be mixed in a glass of water.

The preceding specific embodiments are illustrative of the practice of the invention. It is to be understood, however, that other expedients known to those skilled in the art may be employed without departing from the spirit of the invention.

We claim:
1. The double pectinate of bismuth and aluminum containing between about 23% and about 25% by weight of bismuth and between about 0.5% and about 1.5% by weight of aluminum.

2. The process of producing the double pectinate of claim 2 which comprises the steps of mixing an aqueous solution of a bismuth salt of a strong mineral acid with an aqueous solution of pectin, mixing an aqueous solution of an aluminum salt of a strong mineral acid with said mixed solution, raising the pH of the resultant mixed solution to between 3.5 and 5, and recovering said double pectinate.

3. The process of claim 2 wherein said bismuth salt of a strong mineral acid is bismuth nitrate.

4. The process of claim 2 wherein said aluminum salt of a strong mineral acid is aluminum nitrate.

5. The process of claim 2 wherein said reaction of said pectin with said bismuth salt and said aluminum salt is conducted in the presence of an organic polyol.

6. The process of claim 5 wherein said organic polyol is added to said aqueous solution of a bismuth salt of a strong mineral acid.

7. The process of claim 5 wherein said organic polyol is selected from the group consisting of sorbitol, mannitol and glycerol.

8. The process of claim 2 wherein said pH of the resultant mixed solution is raised to between 3.5 and 5 by the addition of an aqueous solution of an alkali selected from the group consisting of alkali metal carbonates, alkali metal bicarbonates, alkali metal hydroxides and ammonia.

References Cited

UNITED STATES PATENTS

| 3,306,819 | 2/1967 | Farthouat et al. | 260—209.5 XR |
| 2,550,705 | 5/1951 | Maclay | 260—209.5 |

DONALD E. CZAJA, Primary Examiner

R. W. GRIFFIN, Assistant Examiner

U.S. Cl. X.R.

424—180, 296

PO-1050
(5/69)

UNITED STATES PATENT OFFICE
CERTIFICATE OF CORRECTION

Patent No. 3,474,086          Dated October 21, 1969

Inventor(s) Raymond Larde and Andre Couillaud

It is certified that error appears in the above-identified patent and that said Letters Patent are hereby corrected as shown below:

Patent    Appln.

| Col. | Line | Pg. | Line | |
|------|------|-----|------|---|
| 2 | 27 | 4 | 1 | Formula is incorrect where indicated in red with an arrow. The patent has an "O" and it should be an -- H --. |

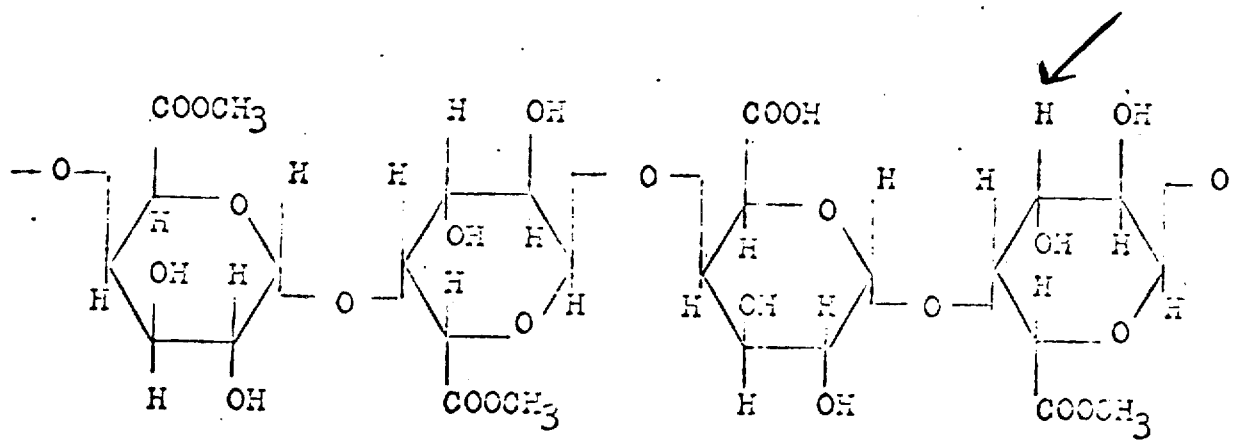

| 4 | 9 | 8 | 15 | Change "+1.65°" to read -- +165° -- |

Remarks

Claim 2 is dependent on claim 1, and it should have been so indicated by the Examiner in his renumbering of the claims.

SEP 15 1970

(SEAL)
Attest:

Edward M. Fletcher, Jr.
Attesting Officer

WILLIAM E. SCHUYLER, JR.
Commissioner of Patents